United States Patent
Priem

(10) Patent No.: US 11,207,750 B2
(45) Date of Patent: Dec. 28, 2021

(54) WELDING DEVICE POSITIONING ARRANGEMENT

(71) Applicant: BRANSON Ultraschall Niederlassung der Emerson Technologies GmbH & Co. OHG, Dietzenbach (DE)

(72) Inventor: Heiko Priem, Brachttal (DE)

(73) Assignee: BRANSON Ultraschall Niederlassung der Emerson Technologies GmbH & Co. OHG, Dietzenbach (DE)

( * ) Notice: Subject to any disclaimer, the term of this patent is extended or adjusted under 35 U.S.C. 154(b) by 168 days.

(21) Appl. No.: 16/532,568

(22) Filed: Aug. 6, 2019

(65) Prior Publication Data
US 2020/0047295 A1 Feb. 13, 2020

(30) Foreign Application Priority Data
Aug. 13, 2018 (DE) .................... DE102018119641.5

(51) Int. Cl.
*B23K 37/04* (2006.01)
(52) U.S. Cl.
CPC .......... *B23K 37/0443* (2013.01); *B23K 37/04* (2013.01)
(58) Field of Classification Search
CPC ............ B23K 37/0443; B23K 37/0461; B23K 37/0408; B23K 37/00; B23K 37/04–0538; B29C 66/8161; B29C 66/8322; B29C 65/7841
USPC ............. 228/212–213, 44.3–44.7, 47.1–49.6
See application file for complete search history.

(56) References Cited

U.S. PATENT DOCUMENTS

| | | | |
|---|---|---|---|
| 3,522,409 A | 8/1970 | Fay et al. | |
| 3,790,059 A * | 2/1974 | Jacke | B29C 66/816 228/1.1 |
| 4,012,275 A * | 3/1977 | Sjoholm | B29C 65/7897 156/515 |

(Continued)

FOREIGN PATENT DOCUMENTS

| CN | 101507089 A | 8/2009 |
|---|---|---|
| CN | 201653665 U | 11/2010 |

(Continued)

OTHER PUBLICATIONS

EP Search Report for EP Application No. 19190546.2 dated Feb. 7, 2020 (9 pages).

(Continued)

*Primary Examiner* — Kiley S Stoner
(74) *Attorney, Agent, or Firm* — Reising Ethington P.C.

(57) ABSTRACT

A welding device with which two components can be pressed against each other comprises a static first section and a second section movable relative to the first section. At least one drive system is connected at a first end to the first section and at a second end to the second section, as well as at least one elastic guiding system by which the first section and the second section are connected to one another. The first section and the second section are movable relative to each other along only one axis due to at least one elastic guiding system, so that an axial length of the arrangement can be varied. A moving coil drive may be used or another drive without mechanical losses or with mechanical losses less than a clamping force to be applied during operation.

17 Claims, 12 Drawing Sheets

(56) References Cited

U.S. PATENT DOCUMENTS

| | | | |
|---|---|---|---|
| 5,490,704 A * | 2/1996 | Calnan | B60P 3/14 |
| | | | 280/764.1 |
| 5,780,943 A | 7/1998 | Ono | |
| 5,858,587 A | 1/1999 | Yamane et al. | |
| 6,040,675 A | 3/2000 | Ono | |
| 6,604,668 B2 | 8/2003 | Crasser | |
| 7,279,814 B2 | 10/2007 | Patt et al. | |
| 8,052,027 B2 * | 11/2011 | Williamson | B21D 51/26 |
| | | | 228/1.1 |
| 8,704,122 B2 | 4/2014 | Vogt et al. | |
| 8,955,291 B2 | 2/2015 | Richter et al. | |
| 9,302,605 B1 * | 4/2016 | Van Pelt | B60P 3/38 |
| 9,969,125 B2 | 5/2018 | Moriizumi et al. | |
| 10,232,555 B2 | 3/2019 | Fuchs | |
| 2003/0164218 A1 * | 9/2003 | Brahm | B60R 21/04 |
| | | | 156/73.5 |
| 2004/0094255 A1 | 5/2004 | Shinohara et al. | |
| 2009/0211694 A1 * | 8/2009 | Hisai | B29C 65/7841 |
| | | | 156/73.5 |
| 2011/0000899 A1 * | 1/2011 | Vogt | B23K 26/1488 |
| | | | 219/121.85 |
| 2015/0020951 A1 * | 1/2015 | Trabandt | B29C 66/8322 |
| | | | 156/73.6 |
| 2017/0129062 A1 | 5/2017 | Caldwell et al. | |
| 2020/0307110 A1 * | 10/2020 | Baek | B29C 66/50 |

FOREIGN PATENT DOCUMENTS

| | | | | |
|---|---|---|---|---|
| CN | 101918169 A | 12/2010 | | |
| CN | 103612022 A | 3/2014 | | |
| CN | 104661771 A | 5/2015 | | |
| CN | 108274763 A | 7/2018 | | |
| CN | 207642485 U | 7/2018 | | |
| DE | 1765979 A1 | 6/1972 | | |
| DE | 3921653 A1 | 1/1991 | | |
| DE | 69605337 T2 | 5/2000 | | |
| DE | 69709440 T2 | 9/2002 | | |
| DE | 102010018288 A1 | 10/2011 | | |
| DE | 102014223121 A1 | 5/2016 | | |
| JP | S5254459 A | 5/1977 | | |
| JP | 62238098 A | * 10/1987 | ......... | B23K 37/0426 |
| JP | H08229759 A | 9/1996 | | |
| JP | H10521 A | 1/1998 | | |
| JP | 2009297874 A | 12/2009 | | |
| JP | 2016087666 A | 5/2016 | | |
| KR | 19980083192 A | 12/1998 | | |
| KR | 20020035850 A | 5/2002 | | |
| KR | 20090034561 A | 4/2009 | | |
| KR | 20170122172 A | 11/2017 | | |
| WO | WO2011093505 A1 | 8/2011 | | |
| WO | WO2015004977 A1 | 1/2015 | | |

OTHER PUBLICATIONS

KR Notice of Allowance for KR Application No. 10-2019-0097228 dated Mar. 25, 2021 (4 pages).
CN Office Action for CN Application No. 201910745874.2 dated Dec. 28, 2020 (13 pages).
JP Notice of Allowance for JP Application No. 2019-148396 dated Sep. 7, 2021 (3 pages).
CN Office Action for CN Application No. 201910745874.2 dated Sep. 13, 2021 (10 pages).

* cited by examiner

WELDING DEVICE POSITIONING ARRANGEMENT

CROSS REFERENCE TO RELATED APPLICATIONS

This application claims the priority of German patent application No. DE102018119641.5, filed on Aug. 13, 2018. The entire content of this priority application is incorporated herein by reference in its entirety.

TECHNICAL FIELD

The present disclosure relates to a welding device positioning arrangement with which, when used in a welding device, a first component can be pressed against a second component with a force, a welding device with this welding device positioning arrangement, a corresponding welding method as well as a retrofit kit for a welding device and a corresponding retrofit method.

BACKGROUND

When welding two components to one another, for example, welding devices with a lifting table are used. FIG. 1 shows a corresponding embodiment of a respective welding device 1. The components to be welded to one another are positioned on the lifting table 3 and the lifting table 3 is moved along the vertical direction. By this, the two components are clamped with a force between the lifting table 3 and an upper tool 5 of the welding device 1. Current welding devices, in particular for small forces and thus for small applications, i.e. small components to be welded, are ultrasonic or laser welding presses which comprise a linear guide and are pneumatically or electrically driven.

The associated lifting table systems show friction losses which occur due to the mechanics used such as linear guides, motors, hydraulics with cylinders, bearings and further components involved in the force-applying system. These friction losses lead to the formation of hysteresis in a force control of the welding device. At this, the force applied via the lifting table shows path dependence. This means that the exact magnitude of the effect depends not only on the causing variable, i.e. the specified nominal force, but also on the history of the adjusting components of the lifting table. A typical hysteresis behavior is the occurrence of a hysteresis loop. This is created by moving the causing variable back and forth between two different values. Thus, depending on the history, the lifting table can assume one of several possible positions with the same input variable.

Moreover, friction losses can lead to the so-called stick-slip effect. This effect is also known as the adhesive sliding effect and characterizes the sticking sliding of solid bodies moving against each other. This may occur if the static friction is noticeably greater than the sliding friction. At this, damped coupled surface parts exert a fast motion sequence: sticking, tensioning, separating and sliding. This effect is often undesired in technical applications. It generates noise and structure-borne noise, which is often perceived as unpleasant and may lead to increased wear and tear and material fatigue. In addition, it can completely prevent the execution of even the smallest movements, for example on precision tool machines.

The limits of the known welding devices therefore lie in the control of low forces, which requires low friction or low losses in the welding device and in particular in the adjustment system of the lifting table, whereby at least a linear behavior is required. At this, the existing guides generate friction and experience has shown that the existing guides have a hysteresis especially in this small force range, which is required for welding filigree components such as foils for in-ear headphones. Here, hysteresis from +/−5 N to +/−30 N are not uncommon. Also all drives like pneumatic cylinder, hydraulic cylinder or electric motor with spindle have losses and friction. Likewise, losses and friction occur during the conversion of a rotary motion into a linear motion.

With regard to welding devices, these effects therefore lead to non-reproducible welding results, especially with small forces required for welding filigree parts such as foils for in-ear headphones, and thus make these components completely non-weldable. Since friction losses and the hysteresis during contact detection can lead to large force peaks, this can also lead to component destruction in small applications.

A technical problem solved by at least some embodiments of the present invention is therefore to provide a welding device with which, in particular, small components can be positioned and welded with a high accuracy, so that in comparison to the prior art, reduced or no force peaks at all occur when a force is applied to the components to be welded.

SUMMARY

The above object may be solved by a welding device positioning arrangement, a welding device with a welding device positioning arrangement, a welding method as well as a retrofit kit for a welding device as well as a retrofit method for a welding device. Further embodiments and further developments are set forth in the following description, the drawings and the claims.

A first alternative of a welding device positioning arrangement with which a first component can be pressed against a second component with a force when used in a welding device comprises: a static first section and a second section movable relative to the static first section, wherein, in operation, the second section can be used to press the first component against the second component, at least one drive system connected with a first end to the first section and with a second end to the second section, and at least one elastic guide system by means of which the first section and the second section are connected to each other, wherein the first section and the second section are movable relative to each other on only one axis due to the at least one elastic guiding system, so that an axial length of the welding device positioning arrangement is variable, and the at least one drive system comprises a moving coil drive.

The first alternative of the welding device positioning arrangement is now described for better comprehensibility in the context of the use in a welding device in operation. The welding device itself can be any welding device, such as an ultrasonic welding device, a laser welding device, an infrared welding device, a vibration welding device or a friction welding device. The welding device provides an upper tool and, during operation, the components to be welded are clamped with the desired force between the upper tool and the second section of the welding device positioning arrangement.

In operation, both components are first arranged on the second section. Then the axial length of the arrangement is changed by means of the moving coil drive as the drive system until the two components to be welded are clamped with the desired force between the second section and the upper tool. In an alternative approach, the first component can initially be positioned on the upper tool and the second component on the second section.

Due to the elastic guiding system, the first and second sections can be moved relative to one another on only one axis. This axis may be a vertical axis in relation to a floor on which the welding machine stands. Furthermore, the elastic guiding system comprises no mechanical losses and therefore operates loss-free. In this context, loss-free means that there may be no friction or, with respect to the force required to weld the two components, only negligible friction between the movable components of the guiding system. A selection of the respective design possibilities of the elastic guiding system will be discussed later with reference to the illustrated and described embodiments.

Due to the choice of the moving coil drive or voice coil actuator as the drive system for the welding device positioning arrangement, the welding device positioning arrangement is a precision welding device positioning arrangement. This means that especially the execution of smallest movements and/or the application of smallest forces can be realized by means of the welding device positioning arrangement. In other words, the welding device positioning arrangement is a mini lifting table, in particular a precision mini lifting table.

The reason for the precision of the welding device positioning arrangement is that a moving coil drive is a highly dynamic drive which displays no mechanical friction. In particular, these drives can be positioned with high precision using the corresponding controls and the force can also be controlled and/or regulated with high precision. Due to their high speed, they are also particularly suitable for automated devices with high cycle rates.

With regard to the adjustable axial length, this depends on the dimensioning of the moving coil drive, which can be adapted to the respective application. Usually, however, amplitudes and thus a change in axial length between 0.25-100 mm can be realized. With regard to the forces that can be applied, these can lie between 0 N and 2 kN. An acceleration of up to 300 m/s$^2$ and speeds of up to 5 m/s can also be realized. As already described above, the moving coil drive is characterized in particular by the very high positioning accuracy, which is particularly at +/−0.1 μm.

The motor current is linear and can be used for force control, so no force sensor is required. This will also be discussed later with reference to the inventive welding device.

The combination of a low-friction and precise drive, namely the moving coil drive, for force build-up and adjustment of the desired axial length and a low-friction guiding, namely the elastic guiding system, prevents any friction loss in the welding device positioning arrangement. As a result, all hysteresis phenomena and stick-slip effects are avoided.

One advantage of the arrangement is therefore that, due to the achievable accuracy, the welding device with the welding device positioning arrangement can also be used for small components, such as welding foils for in-ear headphones or the manufacture of smartphones. Thus, the welding of filigree and/or highly sensitive, especially electronic, components can be realized with very low welding forces. High-precision positioning of the components is also possible, as is significantly improved welding depth control. High force peaks at a contact detection between the two components are reduced and may be completely prevented. In this way, the trigger point for the actual welding start can be controlled with high precision, which leads to reproducible welding connections and any component destruction caused by this can be prevented. The degree of precision of the welding device positioning arrangement now only depends on the accuracy of the used control and the corresponding sensors.

In a further embodiment, the welding device positioning arrangement comprises at least three drive systems. With an arrangement of two or more drive systems, asymmetrical loads can be balanced in synchronized operation. In this way, either the parallelism of the two sections to one another can be ensured or forces can be distributed evenly over the areas to be welded. Component tolerances that require a tilting of the table can also be compensated.

In a further embodiment of the welding device positioning arrangement, the at least one guiding system comprises at least one centering spider or a plurality of springs. Because of this construction it is further emphasized that the elastic guiding system has no mechanical friction between two components of the welding device positioning arrangement which are moved relatively to one another. In addition to the centering spider, as known from loudspeakers, guiding discs, diaphragms, plate guides, multiple linear springs, or similar may be equally preferred. In contrast to conventional guidings, the elastic guiding system shows only internal friction, but no mechanical losses. Thus, the elastic guiding system is also referred to as loss-free. In particular by the combination of the elastic guiding system with the drive system, both the distance between the two sections, i.e. a lifting or adjusting path, and a force to be applied later with the arrangement can be controlled and/or regulated with high precision.

According to a further embodiment, the at least one guiding system comprises a first plate and a second plate, wherein the first plate and the second plate are connected to one another at a first axial end, in particular via a spacing element, and the first plate is connected to the first section at a second axial end, while the second plate is connected to the second section at a second axial end. The two plates are for example leaf springs or spring plates in general. Due to this arrangement, the plates allow only one direction of movement, especially along the vertical axis, and thus serve as guiding for all other directions. Therefore, the plates only allow movement in the force direction. Due to the specific arrangement of the two plates to one another, tensile losses during the movement of the two sections relative to one another can be avoided and length changes in the plates are compensated due to the movement of the welding device positioning arrangement.

It may also be preferred that the welding device positioning arrangement comprises at least two guiding systems, in some implementations at least three and in some implementations at least four guiding systems. With this embodiment, in particular in combination with the embodiment with several drive systems, any tilting movements can be prevented particularly efficiently.

In a further embodiment of the welding device positioning arrangement, the axial length of the welding device positioning arrangement can be varied within a range of ≤200 mm, preferably ≤150 mm and particularly preferably ≤140 mm. At this, it may be preferred to realize small paths, that is, small axial length changes, with the welding device positioning arrangement. Therefore, it may be preferred if the axial length can be varied in a range of ≤20 mm, particularly preferred ≤15 mm and especially ≤10 mm. These particularly preferred ranges of the axial length change are particularly sufficient for processing filigree and/or highly sensitive, especially electronic, components such as foils for in-ear headphones or smartphones.

It may also be preferred that during operation of the welding device positioning arrangement, an actual distance by which the axial length of the welding device positioning arrangement is changed from an initial point differs from a predetermined nominal distance by a maximum of 1 mm, preferably by a maximum of 0.1 mm and particularly preferably by a maximum of 0.01 mm. This high positioning accuracy in particular makes it possible to prevent force peaks during contact between the two components to be welded or at the upper tool.

It may also be preferred that the maximum difference is maintained for at least 3, preferably at least 5 and particularly preferred at least 10 consecutive travelling movements. This means that the maximum difference of, for example, 1 mm is not exceeded for three consecutive travelling movements, i.e. it particularly stays below that difference. In this way, the accuracy and reproducibility of the travelling movements in comparison to known arrangements as well as the resulting precision of the present welding device positioning arrangement are particularly emphasized.

A second alternative welding device positioning arrangement by means of which a first component can be pressed against a second component with a force when used in a welding device comprises: a static first section and a second section movable relative to the static first section, wherein, in operation, the second section can be used to press the first component against the second component, at least one drive system connected at a first end to the first section and at a second end to the second section, and at least one elastic guiding system by means of which the first section and the second section are connected to each other, wherein the first section and the second section are movable relative to one another along only one axis due to the at least one elastic guiding system, so that an axial length of the welding device positioning arrangement is variable, and the at least one drive system comprises a piezo motor, a linear motor, an electromagnetic drive system, a coil system or a drive with field or excitation coil.

First, it should be emphasized that the descriptions of the first alternative of the welding device positioning arrangement as well as of the corresponding embodiments basically apply analogously to the second alternative. The second inventive alternative differs from the first inventive alternative by the existing drive system, which is discussed below.

In principle, a loss-free drive is also provided within the scope of the second alternative, i.e. a drive system that operates without mechanical losses. Examples include piezo motors or piezoelectric motors. These are small motors that use the piezoelectric effect to generate a movement. Piezo motors can operate both linearly and rotatory. The range in which the axial length of the welding device positioning arrangement can be varied is usually a few centimeters in the case of linear piezo motors due to construction and is thus considerably greater than the actuating paths or regulating distance of the piezoelectric solid-state actuators used in the motors. Therefore, piezoelectric solid-state actuators are preferred in addition to piezo motors, especially if particularly small variations in the axial length are to be realized.

With coil systems, simple coils with magnetic armatures can be used for small variations in axial length, e.g. less than 10 mm. In field coil drives, the permanent magnet is replaced by a second coil. With appropriate control of these drives, very high dynamics can be achieved, so that these drives are also suitable for automated welding processes. In general, all mechanical loss-free drives as well as linear motors can be used. With regard to the advantages resulting from the choice of the drive system, reference is made to the explanations of the first inventive alternative of the welding device positioning arrangement.

A third alternative welding device positioning arrangement by means of which a first component can be pressed against a second component with a force when used in a welding device comprises: a static first section and a second section movable relative to the static first section, wherein in operation the second section can be used to press the first component against the second component, at least one drive system which is connected at a first end to the first section and at a second end to the second section, and at least one elastic guiding system by means of which the first section and the second section are connected to one another, wherein the first section and the second section are movable relative to each other along only one axis due to the at least one elastic guiding system so that an axial length of the welding device positioning arrangement is variable, and the at least one drive system comprises a rotatory motor which has mechanical losses which are less than a force with which, in operation, the first component can be pressed against the second component, wherein the force is ≤1 kN, preferably ≤500 N and particularly preferably ≤250 N.

Here, too, it should first of all be emphasized that the explanations regarding the first alternative of the welding device positioning arrangement as well as the corresponding preferred embodiments generally apply analogously to the third alternative. The third inventive alternative differs from the first and the second inventive alternative by the existing drive system, which will be discussed in the following.

In contrast to the two previously mentioned drive systems, a drive system with mechanical losses is now present. However, these mechanical losses are lower than the force to be applied. Therefore, the welding device positioning arrangement according to the third alternative is also a precision welding device positioning arrangement which, especially in combination with the elastic guiding system, can also be used for filigree and/or highly sensitive components. However, the range of application of the welding device positioning arrangement according to the third alternative is limited by the fact that the force to be applied to the components to be welded must be higher than the friction losses of the drive system and thus higher than for the two alternatives discussed above. With regard to the advantages resulting from the choice of this drive system, reference is made to the explanations on the first and the second inventive alternative of the welding device positioning arrangement.

A welding device comprising a welding device positioning arrangement and an upper tool and a control unit, wherein the movable second section of the welding device positioning arrangement is movable relative to the upper tool by means of the control unit such that a first and a second component to be welded with each other can be clamped by applying a force between the upper tool and the movable second section of the welding device positioning arrangement. Due to the use of the arrangement in the welding device, the advantages discussed above can be achieved. Therefore, reference is made to the above explanations in order to avoid unnecessary repetitions.

In a further embodiment of the welding device, the force with which the components to be welded together can be clamped is ≤1 kN, preferably ≤500 N and particularly preferred ≤250 N. Especially with filigree components, even lower forces are required, so that ranges of ≤20 N, preferably ≤10 N and particularly ≤5 N are preferred.

It is further preferred that the components to be welded are weldable in the welding device by means of ultrasonic welding, laser welding, infrared welding, vibration welding or friction welding. Laser welding in particular may be laser transmission welding. Thus, the arrangement can be used in versatile welding processes to clamp the components to be welded. However, in the case of welding processes, it is particularly the material-friendly connection techniques such as laser welding or infrared welding that may be preferred. This is due to the fact that in particular filigree and/or highly sensitive components can be welded with the welding device. By means of the material-friendly connection techniques, for example, a later final or intermediate product retains its optical properties.

In a further embodiment, the welding device also comprises a lifting table, whereby the static first section of the welding device positioning arrangement is an integral part of the lifting table or is connected to the lifting table. By means of these embodiments, the arrangement can be integrated into existing welding devices, for example. In addition, a longer closing or feeding path can be achieved in this way, so that the opening between the second section and the upper tool can be correspondingly large, which is particularly advantageous especially when manually equipping the components to be welded. For example, in an initial position, both the lifting table as well as the second section of the welding device positioning arrangement are at maximum distance from the upper tool. The welding device positioning arrangement therefore initially has the smallest axial length. After inserting the components to be welded, the lifting table with the welding device positioning arrangement is now moved in the direction of the upper tool along one axis, i.e. the vertical axis, until a first intermediate position is reached. In the same way, it is also possible to move the upper tool in the direction of the lifting table. Combinations of these movements are also preferred, so that the lifting table and upper tool move towards or away from each other at the same time or at different times. Following this or shortly before the end of the travelling movement of the lifting table and/or the upper tool, the second section of the welding device positioning arrangement is moved in the direction of the upper tool and the components to be welded are pressed against the upper tool due to the travelling movement of the second section and are clamped there with a desired force.

It may be further preferred that in the welding device an actual force, with which the components to be welded to one another are clamped during operation, differs from a predetermined nominal force by a maximum of 2.5 N, preferably by a maximum of 1 N and particularly preferably by a maximum of 0.5 N. In this way, in particular peaks in force when the components to be welded come into contact with each other or with the upper tool are avoided, which prevents a possible component destruction.

In a further embodiment of the welding device, an actual path, by which the axial length of the welding device positioning arrangement is varied from a point of origin during operation, differs from a predetermined nominal path by a maximum of 1 mm, preferably by a maximum of 0.1 mm and particularly preferably by a maximum of 0.01 mm. Due to this high positioning accuracy, the welding device may be suitable for processing small, filigree and/or highly sensitive components.

It is also advantageous that the maximum difference in the welding device is maintained for at least 3, preferably at least 5 and particularly preferably at least 10 consecutive welding processes. This means that the maximum difference of, for example, 1 mm is not exceeded in three consecutive welding processes, i.e. it may stay below that difference. In this way, the accuracy and reproducibility of the welding processes in comparison to known arrangements are emphasized.

A welding method for connecting a first component to a second component using a welding device comprises the steps: arranging the first component on the movable second section of the welding device positioning arrangement and the second component on the first component or in an upper tool of the welding device, moving the second section relative to the first section so that the first and second components are held clamped between the upper tool and the second section by applying a force of in particular ≤1 kN, preferably ≤500 N and in particular preferably ≤250 N, and welding the two components to one another. Since the welding method uses the welding device, reference is made to the above explanations with regard to the resulting advantages in order to avoid unnecessary repetitions.

In a further embodiment of the welding method, the welding device comprises a lifting table and the welding method comprises the further step of: moving the lifting table towards the upper tool of the welding device prior to moving the second section relative to the first section so that a desired distance between the second section and the upper tool can be set up first. In the same way, alternatively or additionally, the step is preferred: moving the upper tool in the direction of the welding device positioning arrangement before moving the second section relative to the first section, so that a desired distance between the second section and the upper tool can be set up first. Thus, the welding device positioning arrangement is present as an additional component to a conventional lifting table. This setup may be suitable for manual equipping of the welding device with the components to be welded or for components to be welded the combined component height of which is greater than a maximum length variation of the welding device positioning arrangement.

It may be further preferred that in the welding process the force is controlled via a motor current of the drive system. In this way, no individual or separate force sensor is required, since, for example, the force is controlled via a motor current for the moving coil drive or similar. This setup may therefore be suitable for drive systems the motor current of which is proportional, especially linear, to the applied force.

According to one embodiment of the welding method, an actual force with which the components to be welded are clamped differs from a predetermined nominal force by a maximum of 2.5 N, preferably by a maximum of 1 N and particularly preferably by a maximum of 0.5 N. Additionally or alternatively, it may be preferred that an actual path by which the axial length of the welding device positioning arrangement is varied from a point of origin differs from a predetermined nominal path by a maximum of 1 mm, preferably by a maximum of 0.1 mm and particularly preferably by a maximum of 0.01 mm. In a further embodiment of the welding method, the maximum difference is maintained for at least 3, preferably at least 5 and particularly preferably at least 10 consecutive welding processes. With these designs, alone or in combination with one another, the accuracy of the welding method is emphasized. In this way it may become clear that filigree and/or sensitive components can be clamped by means of the welding device in order to weld these. Thereby a destruction or damage of the components is prevented or avoided due to the high accuracy compared to known devices.

A retrofit kit for a welding device, in particular a welding device with a lifting table, comprises a welding device positioning arrangement. With the retrofit kit, existing welding devices can be retrofitted with the welding device positioning arrangement. Therefore, with regard to the resulting advantages, reference is made to the above explanations on the welding device positioning arrangement. It is understood that even in this preferred retrofit kit, the lifting table and upper tool are arranged so that they are movable relative to each other. This means that the lifting table moves in the direction of the upper tool or the upper tool moves in the direction of the lifting table or that these movement alternatives are combined with each other.

A retrofitting method for a welding device, in particular a welding device with a lifting table, with welding device positioning arrangement comprises the steps: providing a welding device positioning arrangement and attaching the welding device positioning arrangement to the welding device, in particular to the lifting table, in such a manner that during operation a first and a second component can be clamped between an upper tool of the welding device and the second section of the welding device positioning arrangement by applying a force. With the retrofitting method, existing welding devices can be retrofitted with the welding device positioning arrangement. Therefore, with regard to the resulting advantages, reference is also made to the above explanations on the welding device positioning arrangement.

BRIEF DESCRIPTION OF THE DRAWINGS

In the following, the present disclosure is described in detail with reference to the drawings. Identical reference signs in the drawings indicate identical components and/or elements. Showing.

DETAILED DESCRIPTION

In the following, different preferred embodiments of welding device positioning arrangements 20a-20i are discussed with reference to FIGS. 2 to 18. Due to their dimensions, the welding device positioning arrangements can also be referred to as mini lifting table. With this mini lifting table, for example, particularly filigree and/or highly sensitive, for example electronic, components can be processed in a welding device. In particular, all the embodiments shown represent precision welding device positioning arrangements 20a-20i due to the achievable accuracy in positioning and force adjustment, which will now be explained in detail.

Figure 1:
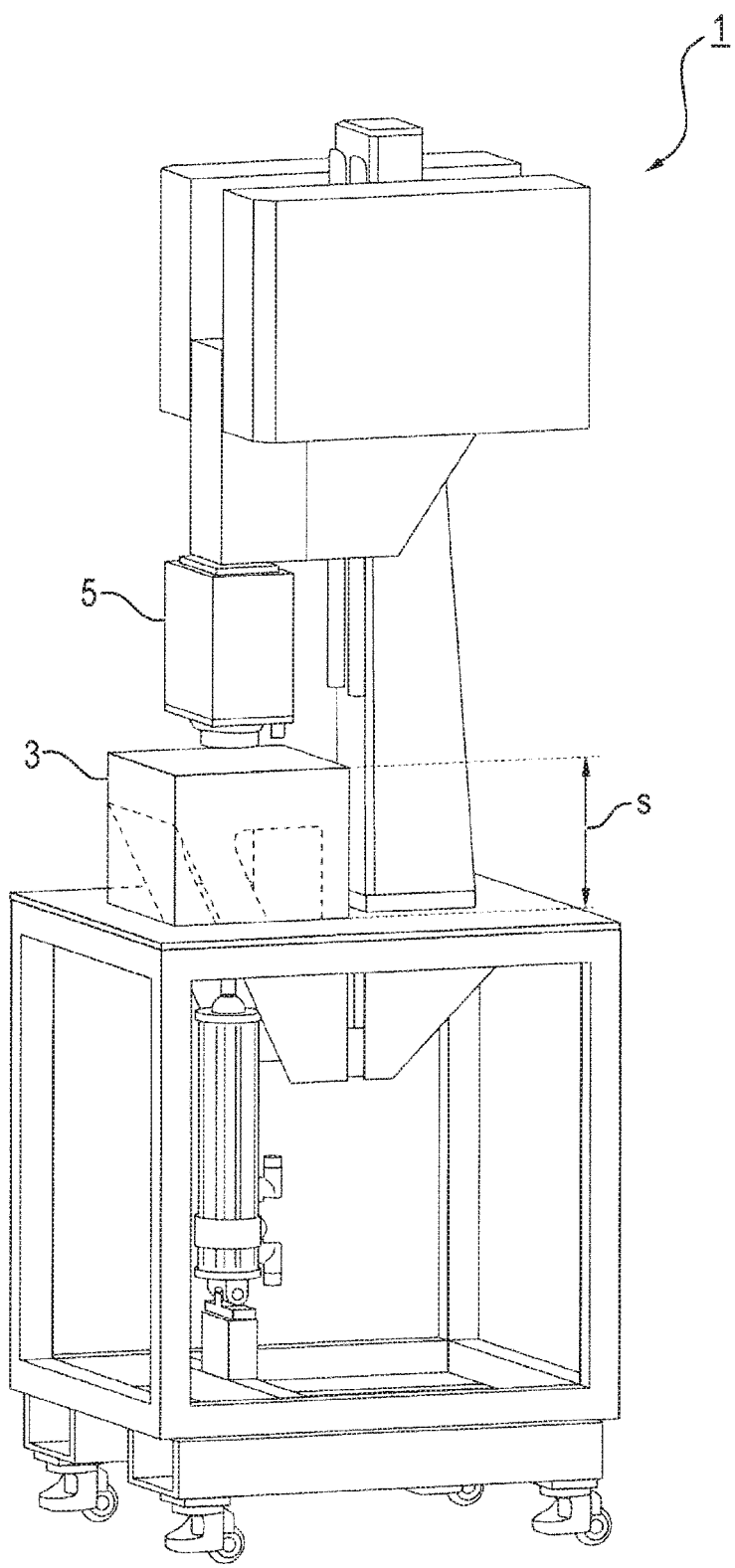
FIG. 1 a welding device according to prior art.
Figure 2:
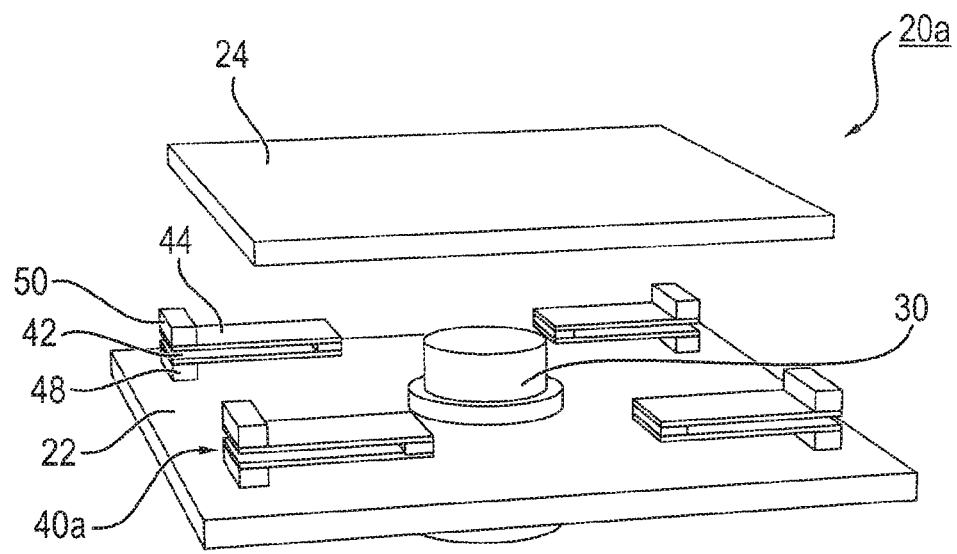
FIG. 2 an exploded view of a first embodiment of a welding device positioning arrangement with a drive system and four elastic guiding systems, FIG. 3 a perspective view of an embodiment of an elastic guiding system, FIG. 4 an exploded view of a second embodiment of a welding device positioning arrangement with three drive systems and three elastic guiding systems, FIG. 5 a perspective view of a lifting table as well as the welding device positioning arrangement according to FIG. 2 and FIG. 4, FIG. 6 a perspective view of a third embodiment of a welding device positioning arrangement with a drive system and three elastic guiding systems, FIG. 7 a top view of the third embodiment according to FIG. 6, FIG. 8 a perspective view of a fourth embodiment of a welding device positioning arrangement with a drive system and four elastic guiding systems, FIG. 9 a top view of the fourth embodiment according to FIG. 8, FIG. 10 a perspective view of a fifth embodiment of a welding device positioning arrangement with a drive system and four elastic guiding systems, FIG. 11 a perspective view of a sixth embodiment of a welding device positioning arrangement with a drive system and a centering spider as elastic guiding system, FIG. 12 a sectional view of the sixth embodiment according to FIG. 11, FIG. 13 a perspective view of the sixth embodiment according to FIG. 11 with semi-transparent sheath, FIG. 14 a perspective view of a seventh embodiment of a welding device positioning arrangement similar to the sixth embodiment, wherein the sensors are located inside, FIG. 15 a perspective view of the seventh embodiment according to FIG. 14 with semi-transparent sheath, FIG. 16 a perspective view of an eighth embodiment of a welding device positioning arrangement with a drive system, FIG. 17 a sectional view of the eighth embodiment according to FIG. 16, FIG. 18 a sectional view of a ninth embodiment of a welding device positioning arrangement, FIG. 19 an embodiment of a welding device, FIG. 20 a flow chart of an embodiment of a welding method, and FIG. 21 a flowchart of an embodiment of a retrofit method.
Figure 19:
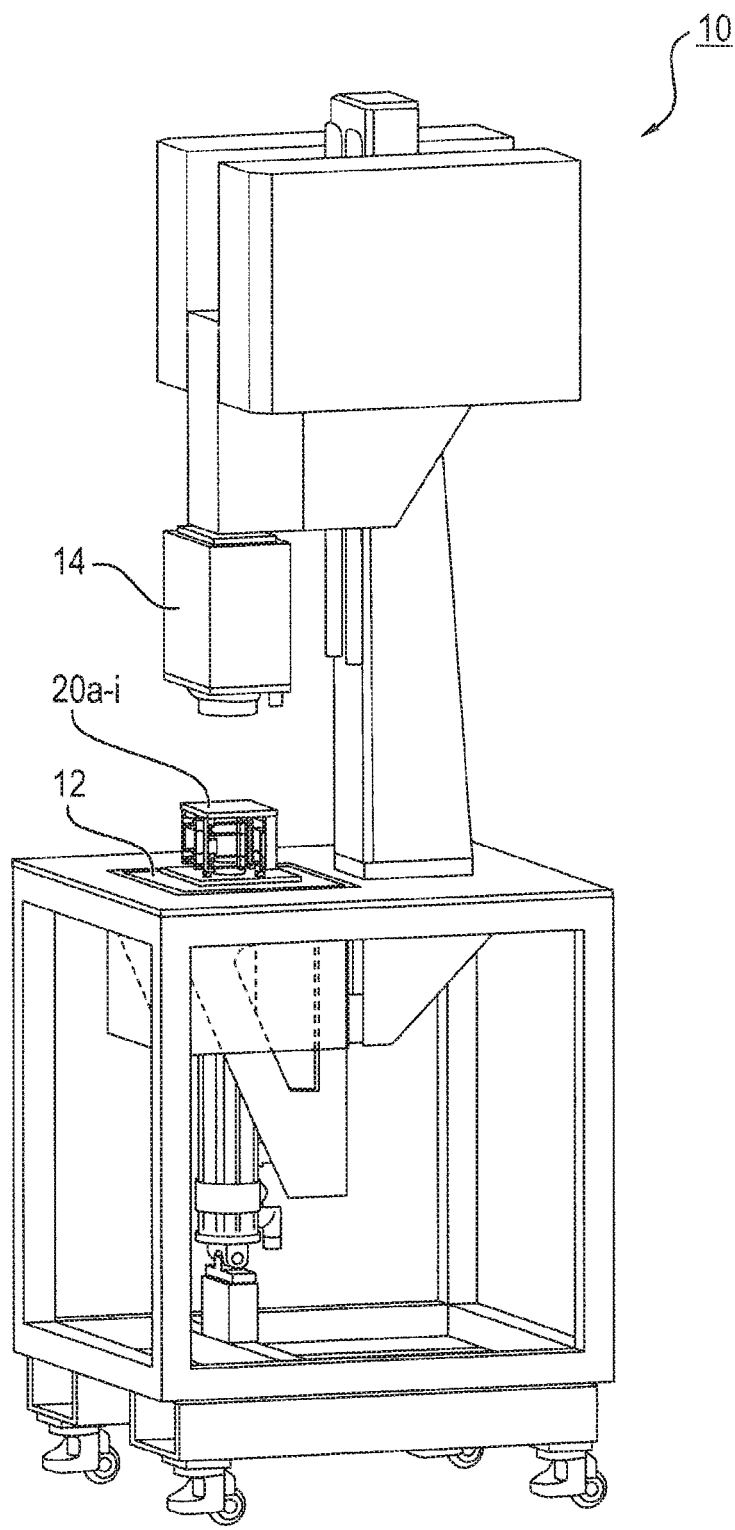

First, with reference to FIG. 2, a first embodiment of a welding device positioning arrangement 20a is shown. The welding device positioning arrangement 20a comprises a static first section 22 and a second section 24 which is movable relative to the static first section. In the example shown, the two sections 22 and 24 are two rectangular plates. Here, the dimensioning of the plates can be adapted to the desired application. In the later operation, the components to be welded are clamped between the second section 24 and an upper tool 14 of a welding device 10, as shown in FIG. 19. Therefore, a first component can be pressed against a second component by means of the second section 24.

The welding device positioning arrangement 20a further comprises a drive system in the center which comprises a moving coil drive 30 or voice coil actuator. A first end of the moving coil drive 30 is connected to the first section 22 and a second end is connected to the second section 24.

Due to this drive choice, the welding device positioning arrangement 20a is a precision welding device positioning arrangement. This means that in particular the execution of the smallest movements and/or the application of the smallest forces can be realized by means of the welding device positioning arrangement 20a. In other words, the welding device positioning arrangement 20a is a mini lifting table, in particular a precision mini lifting table.

The precision of the welding device positioning arrangement 20a is based on the fact that a moving coil drive is generally a highly dynamic drive which does not display any mechanical friction. With regard to an adjustable axial length, i.e. the adjustable distance between the first plate of the first section 22 and the second plate of the second section 24, this depends on the dimensioning of the moving coil drive. Typically, however, amplitudes and thus a variation of the axial length between 0.25-100 mm can be realized. With regard to the applicable forces, these can lie between 0 N and 2 kN. An acceleration of up to 300 m/s$^2$ and speeds of up to 5 m/s may also be realized. In addition, the moving coil drive 30 is characterized in particular by its very high positioning accuracy, which may be at +/−0.1 μm. In addition, the motor current is linear and can be used for force control, so no force sensor is required to regulate the actual force. As can be seen from the above designs, the moving coil drive 30 can be positioned with high precision using the respective control and the force can also be controlled and/or regulated with high precision. In addition, due to their high speed, moving coil drives may be suitable for automated devices with high cycle rates.

In alternatively preferred designs, the drive system is a piezo motor, a linear motor, an electromagnetic drive system, a coil system or a drive with field or exciter coil. It may also be preferred that the drive system comprises a rotatory motor which has mechanical losses which are lower than a force with which the first component can be pressed against the second component during operation, wherein the force is ≤1 kN, preferably ≤500 N and particularly preferably ≤250 N. With the exception of the rotatory motor with mechanical losses, the other drive systems have no mechanical losses, for example due to friction between two components. The present disclosure therefore concerns loss-free drives with which a precision mini lifting table can be realized.

Furthermore, in the shown design, the welding device positioning arrangement 20a has four elastic guiding systems 40a. The first section 22 and the second section 24 are connected by the elastic guiding systems 40a. Due to the combination of the moving coil drive 30 with the elastic guiding system 40a, the first section 22 and the second section 24 can be moved relative to each other along only one axis. By combining the elastic guiding system 40a with the moving coil drive 30, an axial length of the welding device positioning arrangement 20a can be varied.

The elastic guiding system 40a displays no mechanical losses, i.e. it works loss-free within the scope of the present invention. In this context, loss-free means that there might be no friction or, with regard to the force required to weld the two components, only negligible friction between the movable components of the elastic guiding system 40a.

By combining the low-friction and precise drive, namely the moving coil drive 30, for force build-up and adjustment of the desired axial length as well as a low-friction elastic guiding system 40a, any friction losses in the welding device positioning arrangement 20a are preferably prevented. As a result, all hysteresis phenomena and stick-slip effects are avoided or at least significantly reduced compared to known lifting tables for welding devices. Therefore, the welding device positioning arrangement 20a may be suitable for use in a welding device with which small components are to be processed, such as foils for in-ear headphones or the manufacture of smartphones. High force peaks during contact recognition between the two components are also reduced and may be completely prevented. In this way, the trigger point for the actual welding start can be controlled with high precision, which leads to reproducible welding connections and any component destruction caused by this can be prevented.

Figure 3:
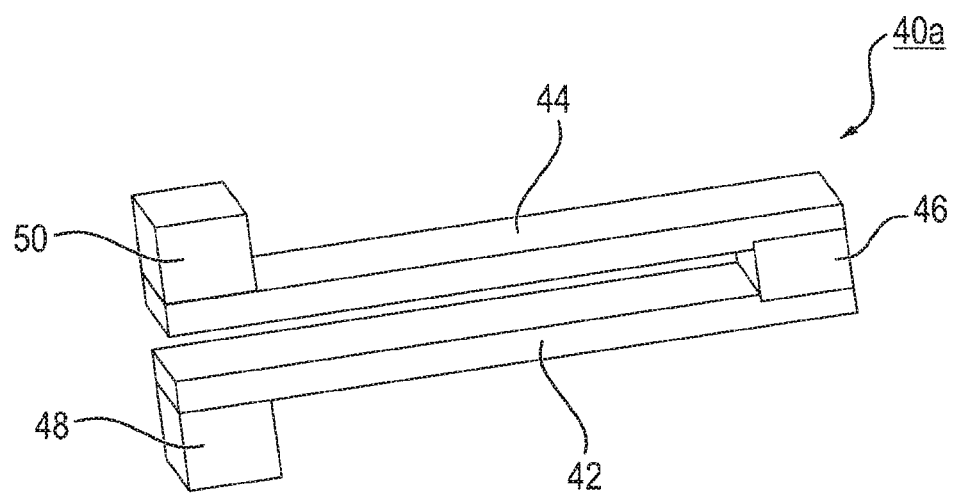

In addition, with reference to FIG. 3, a setup of the elastic guiding system 40a is described. Here the elastic guiding system 40a comprises a first plate 42 and a second plate 44. The first plate 42 and the second plate 44 are connected to each other at a first axial end via a spacing element 46. Furthermore, at a second axial end, the first plate 42 is connected to the first section 22. Accordingly, at a second axial end, the second plate 44 is connected to the second section 24. In the shown embodiment, the two plates 42, 44 are each connected to the respective section 22, 24 via a first 48 and a second connecting element 50.

The two plates 42, 44 are, for example, leaf springs or spring plates in general. These have a length that is greater than the width. In the embodiment shown, the elastic guiding systems 40a are each arranged adjacent to the corner portions of the first 22 and the second section 24 in such a manner that the longitudinal sides as well as the sides transverse thereto are aligned along parallel axes. The parallelly extending axes also extend in parallel to the edges of the first 22 and the second section 24. The distance element 46 connecting the two plates 42, 44 is arranged facing inwards with respect to the welding device positioning arrangement 20a.

Due to this special arrangement, the plates 42, 44 allow only one movement direction and thus serve as guiding for all other directions. Due to the specific arrangement of the two plates 42, 44 to each other, tensile losses during the movement of the two sections 22, 24 to each other can also be avoided and length variations in the plates 42, 44 are compensated due to the movement of the welding device positioning arrangement 20a. Due to the plurality of elastic guiding systems 40a, any unwanted tilting movements can be prevented particularly efficiently.

Figure 4:
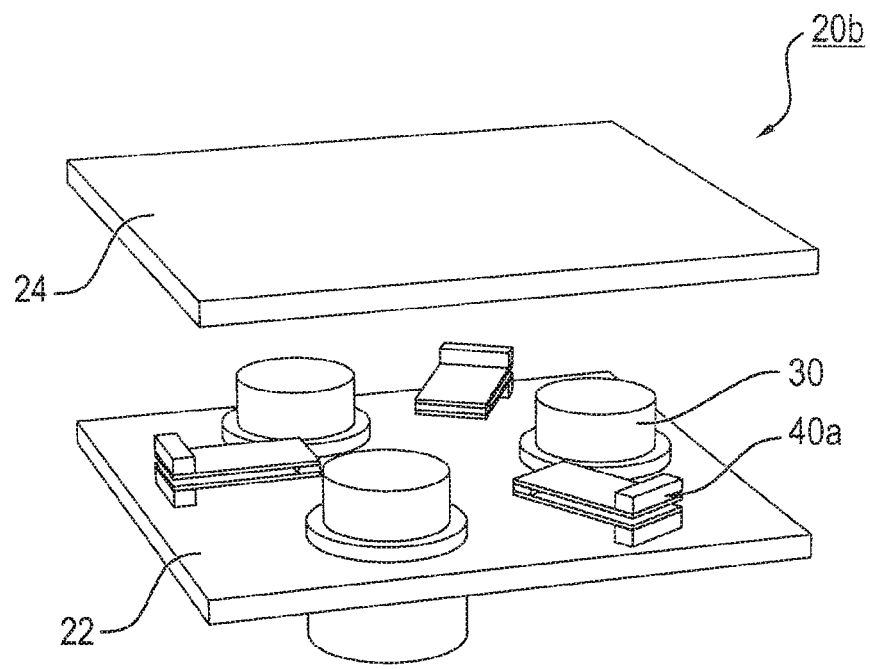

In FIG. 4 a second embodiment of a welding device positioning arrangement 20b is shown. Here, three moving coil drives 30 are provided, which are equally spaced on an imaginary circle. In addition, three elastic guiding systems 40a are provided, which are also equally spaced on an imaginary circle. In addition, a moving coil drive 30 alternating with an elastic guiding system 40a is arranged, respectively. By means of the plurality of moving coil drives 30 and the plurality of elastic guiding systems 40a, asymmetrical loads can be specifically balanced in synchronized operation of the moving coil drives 30. In this way, either the parallelism of the two sections 22 and 24 can be ensured or forces can be distributed evenly over the welding surfaces of the components to be welded. Component tolerances that require a tilting of the table can also be compensated.

Figure 5:
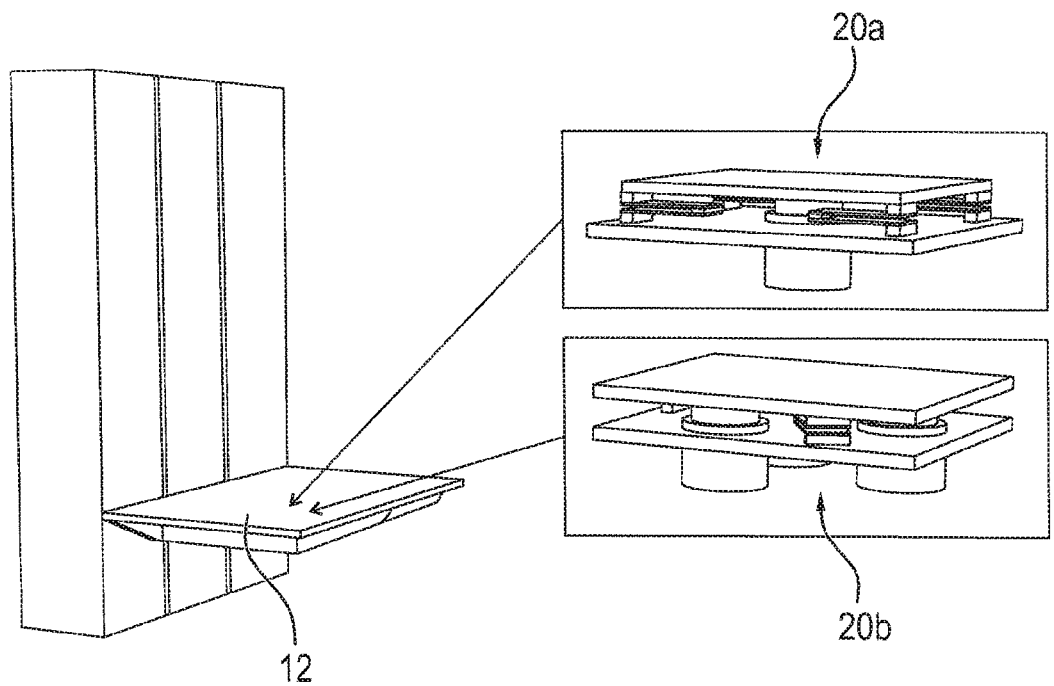

FIG. 5 illustrates the arrangement of one of the above-discussed designs of the welding device positioning arrangement 20a, 20b on a lifting table 12. This combination in particular allows larger adjusting paths to be achieved by means of the lifting table 12, while a closing or feeding movement itself is performed with high precision by means of the welding device positioning arrangement 20a, 20b. Instead of or in addition to the movability of the lifting table 12, a movability of the upper tool in the direction of the positioning arrangement 20a, 20b can also be provided.

Now, referring to FIGS. 6 to 10, three further designs of welding device positioning arrangements 20c, 20d and 20e are shown. These designs are similar to the first two designs, but differ in the setup and arrangement of the elastic guiding system 40b.

Figure 6:
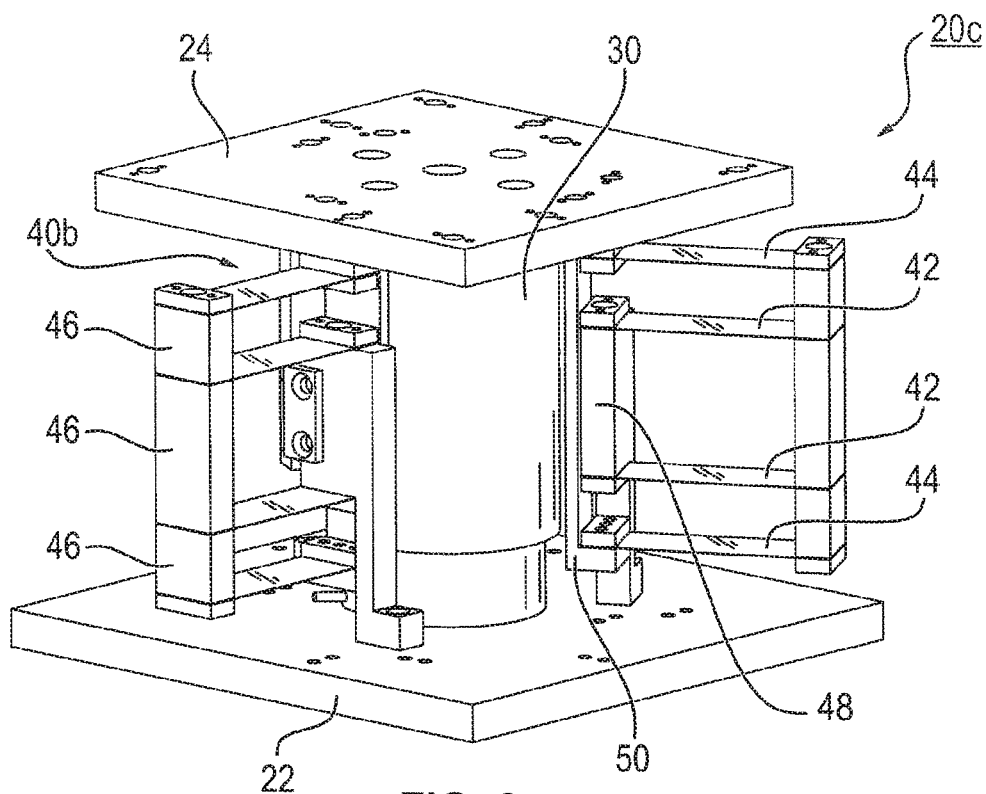
Figure 7:
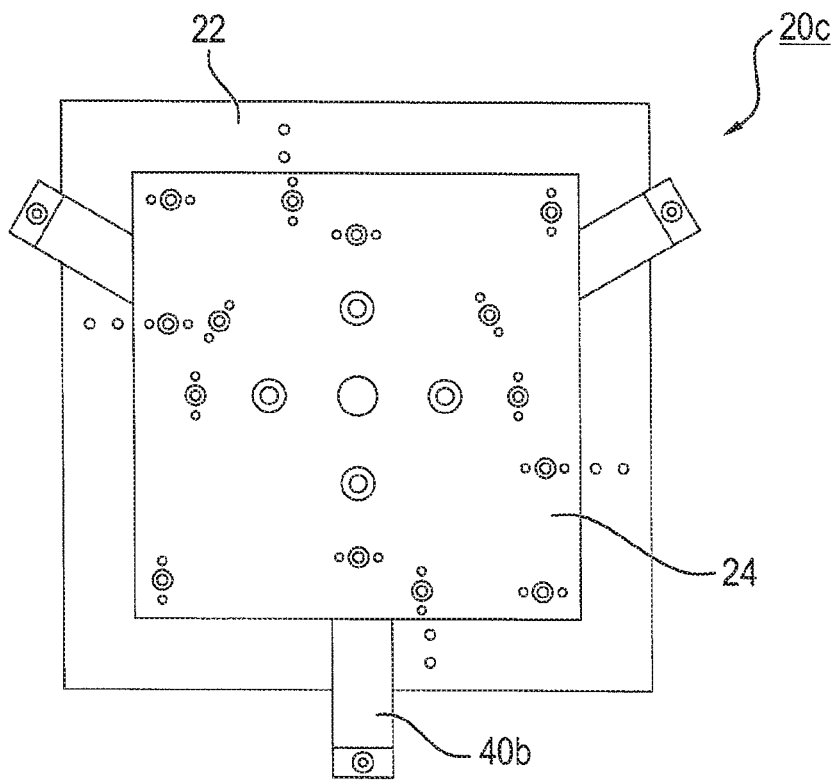

FIGS. 6 and 7 show a third embodiment of a welding device positioning arrangement 20c. The moving coil drive 30 is provided at the center. In contrast to the first and the second embodiment, the elastic guiding system 40b comprises two first 42 and second plates 44 arranged one above the other. The first plates 42 are connected to the first section 22 by means of a shared first connecting element 48. The second plates 44 are correspondingly connected to the second section 24 by means of a shared second connecting element 50. A total of three elastic guiding systems 40b are provided, which are arranged equally spaced on an imaginary circle around the moving coil drive 30. A shared distance element 46 connecting the first 42 and second plates 44 to one another is arranged radially outwardly with respect to the imaginary circle. Referring to FIG. 7, the second section 24 is smaller, i.e. it comprises a smaller edge length than the first section 22.

Figure 8:
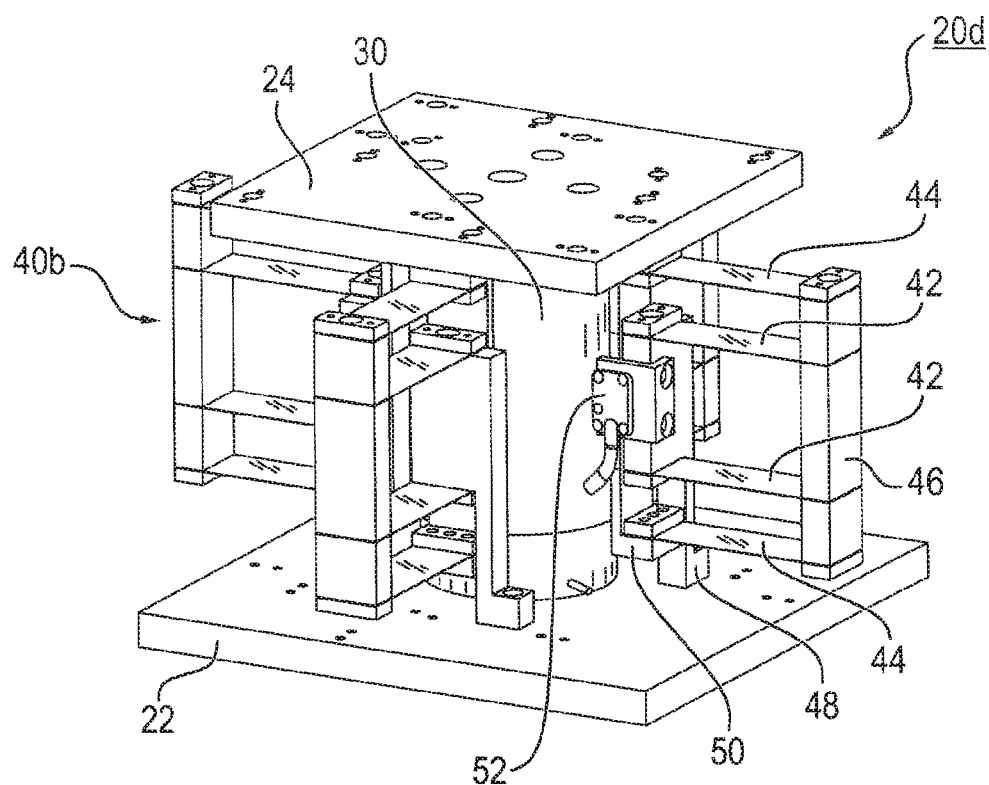
Figure 9:
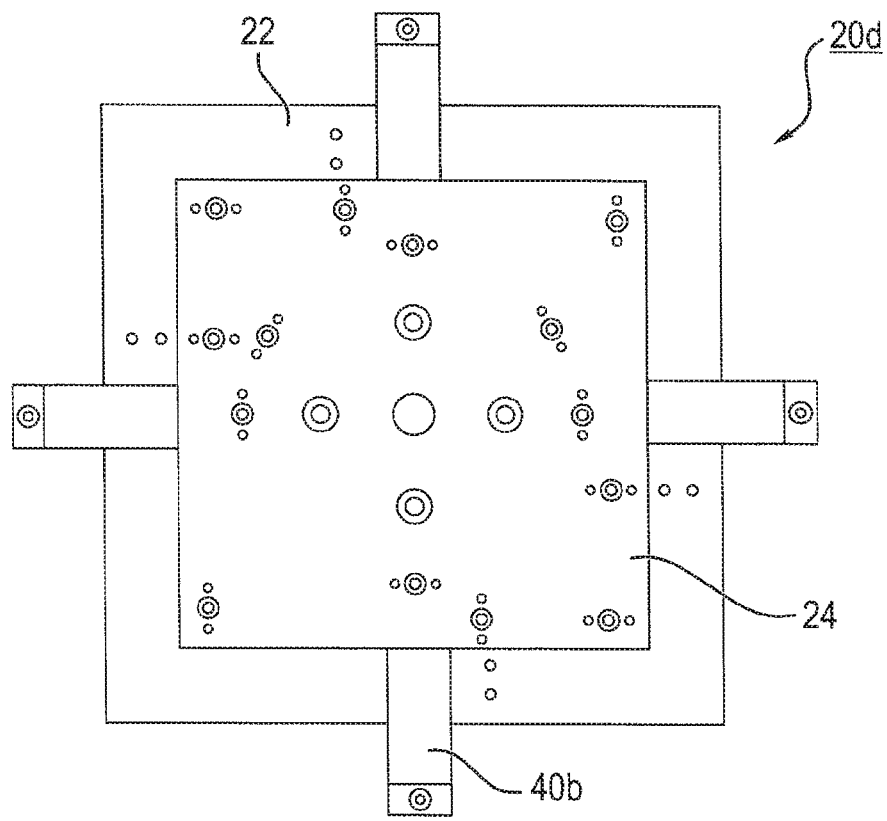

In FIGS. 8 and 9 a fourth embodiment of a welding device positioning arrangement 20d is shown. This differs from the third embodiment according to FIGS. 6 and 7 only in the number and arrangement of the elastic guiding systems 40b used. Instead of three elastic guiding systems 40b, four elastic guiding systems 40b are provided. Each elastic guiding system 40b is arranged centrally with respect to an edge length of the respective side of the first 22 and second section 24. The distance element 26 is respectively arranged further away from the moving coil drive 30 than the two connecting elements 48, 50. In addition, on one of the elastic guiding systems 40b, a path sensor 52 is schematically present, which is arranged on the first connecting element 48 in the shown embodiment and detects a movement of the second connecting element 50, i.e. also of the second section 24.

Figure 10:
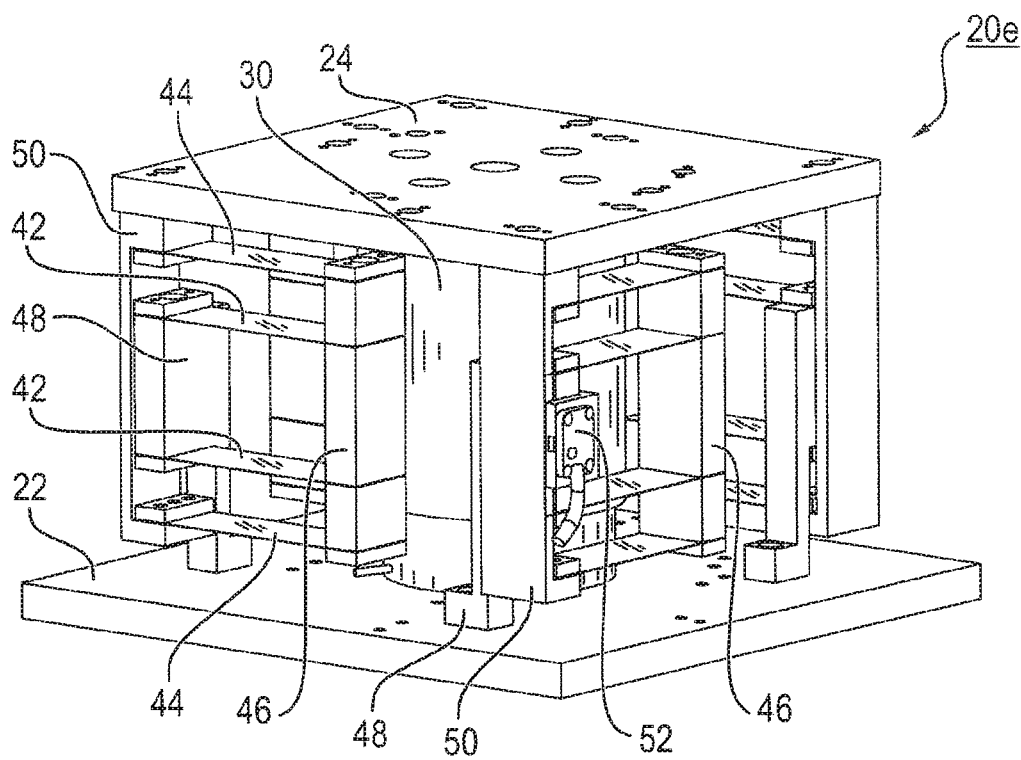

FIG. 10 eventually shows a fifth embodiment of a welding device positioning arrangement 20e. This differs from the fourth embodiment according to FIGS. 8 and 9 in the arrangement of the elastic guiding systems 40b. Here the second connecting elements 50 are arranged adjacent to the respective corners of the second section 24 and the first 42 and second plates 44 are arranged with their longitudinal sides in parallel to the respective edges of the first 22 and second section 24. In this way, the distance elements 46 are not arranged to protrude when the welding device positioning arrangement is viewed from above, i.e. from the second section 24.

Two further embodiments of a welding device positioning arrangement 20f and 20g are shown in FIGS. 11 to 15. The embodiments shown here are fundamentally different from the embodiments discussed above.

Figure 11:
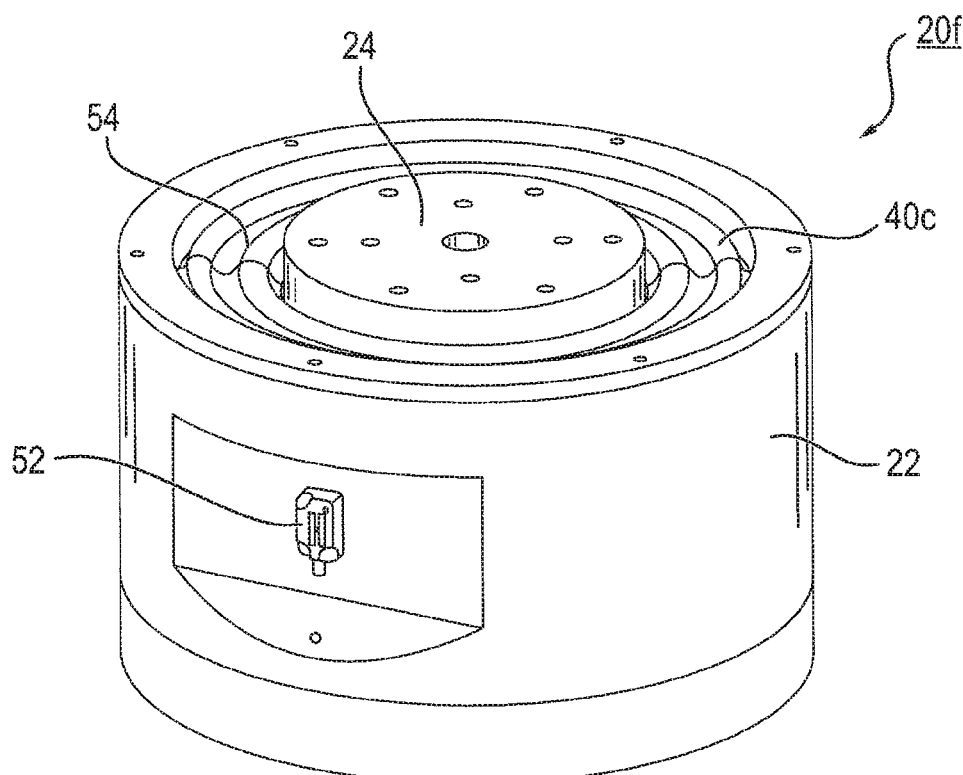
Figure 12:
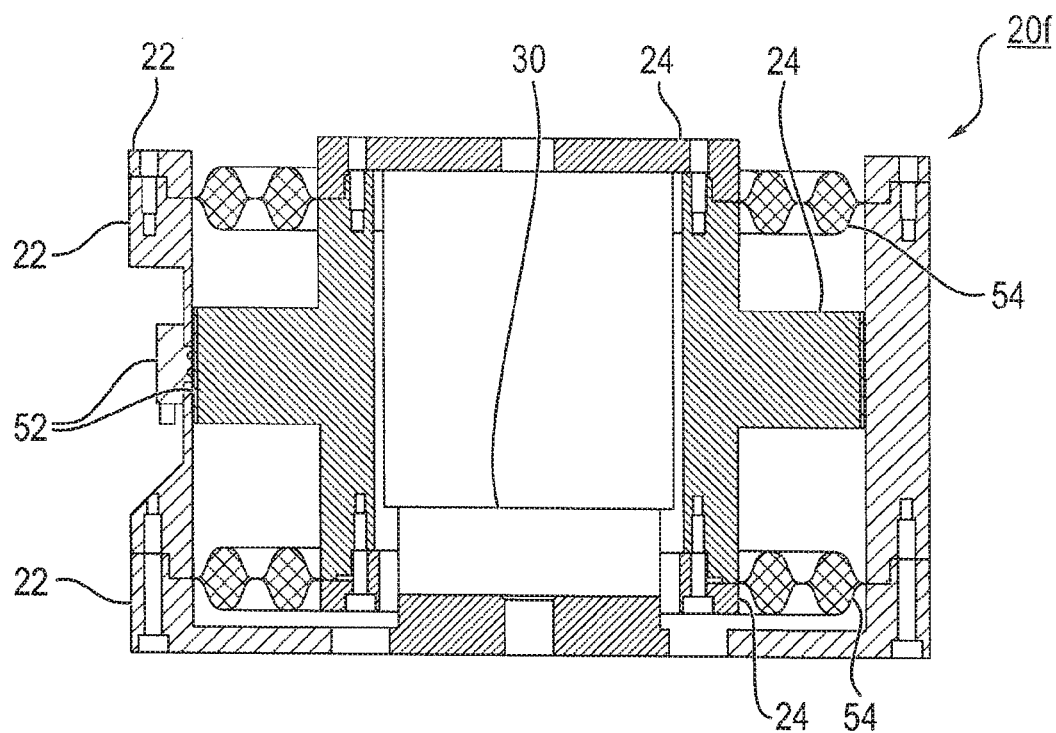
Figure 13:
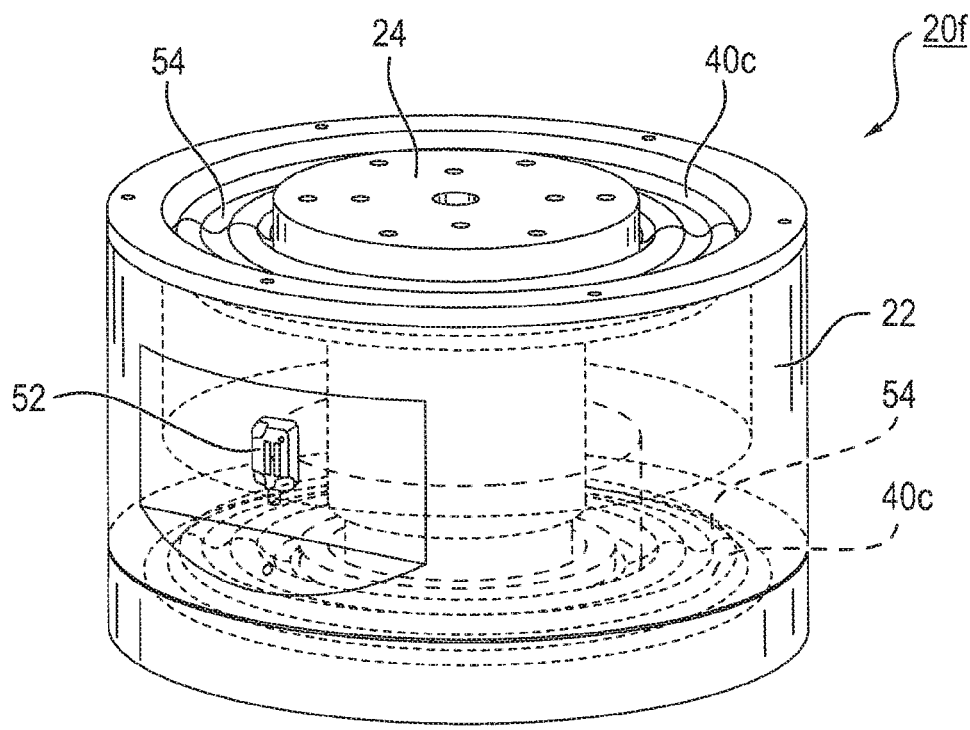

First, referring to FIGS. 11 to 13, the sixth embodiment of the welding device positioning arrangement 20f is described. In this embodiment, the first section 22 is formed by a cylindrically shaped body which is formed closed on one side. The moving coil drive 30 is arranged centrally in the first section 22, wherein the second section 24 is arranged at the second axial end of the moving coil drive 30. The second section 24, for example, is also formed cylindrically shaped with a closed end, wherein the second section 24 formed in this manner is arranged above the moving coil drive 30. Therefore, an opening of the second section 24 faces the base of the first section 22.

The first 22 and the second section 24 are connected to each other by means of the elastic guiding system 40c. Here, two of these are present, each consisting of a centering spider 54. In this context, both the first section 22 and the second section 24 have three portions, each connected to one another by means of screws, as shown in FIG. 12. The first section 22 has a circularly shaped base portion, a cylindrically shaped middle portion and a ring-shaped top portion. The second section 24 comprises a circularly shaped upper face, a cylindrically shaped middle portion with a radially outwardly projecting projection and a ring-shaped base. A first centering spider 54 is fastened radially externally between the ring-shaped top face and the cylindrically shaped middle portion of the first section 22 and radially internally between the ring-shaped top face and the cylindrically shaped middle portion of the second section 24. Analogously, a second centering spider 54 is fastened radially externally between the circularly shaped base and the cylindrically shaped middle portion of the first section 22 and radially internally between the ring-shaped base and the cylindrically shaped middle portion of the second section 24. Furthermore, the circularly shaped top face of the second section 24 and the ring-shaped top face of the first section 22 may be arranged almost in alignment with each other in the initial state, as is shown in FIG. 12. The radial projection in the cylindrically shaped middle portion of the second section 24 serves to detect a movement of the second section 24 relative to the first section 22 by means of the path sensor 52.

In addition to the centering spider 54, as known from loudspeakers, alternatively, guiding discs, diaphragms, plate guides, multiple linear springs, or similar are preferred in the same way. In contrast to conventional guidings, the elastic guiding system displays only internal friction, but no mechanical losses. Therefore, the elastic guiding system is also referred to as loss-free. In particular by combining the elastic guiding system with the drive system, both the distance between the two sections, that is, a lifting or adjusting path, and a force to be applied later with the welding device positioning arrangement 20f can be precisely controlled and/or regulated.

During operation of the welding device positioning arrangement 20f, the upper side of the second section 24 thus moves upwards, so that a distance between the ring-shaped base of the second section 24 and the circularly shaped base of the first section 22 is increased. After completion of the welding process, for example, the two sections 22, 24 return to their initial position or to a suitable intermediate position.

Figure 14:
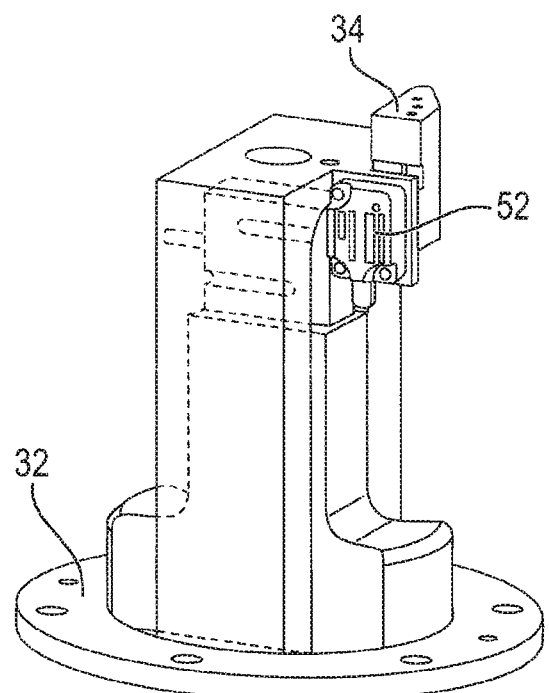
Figure 15:
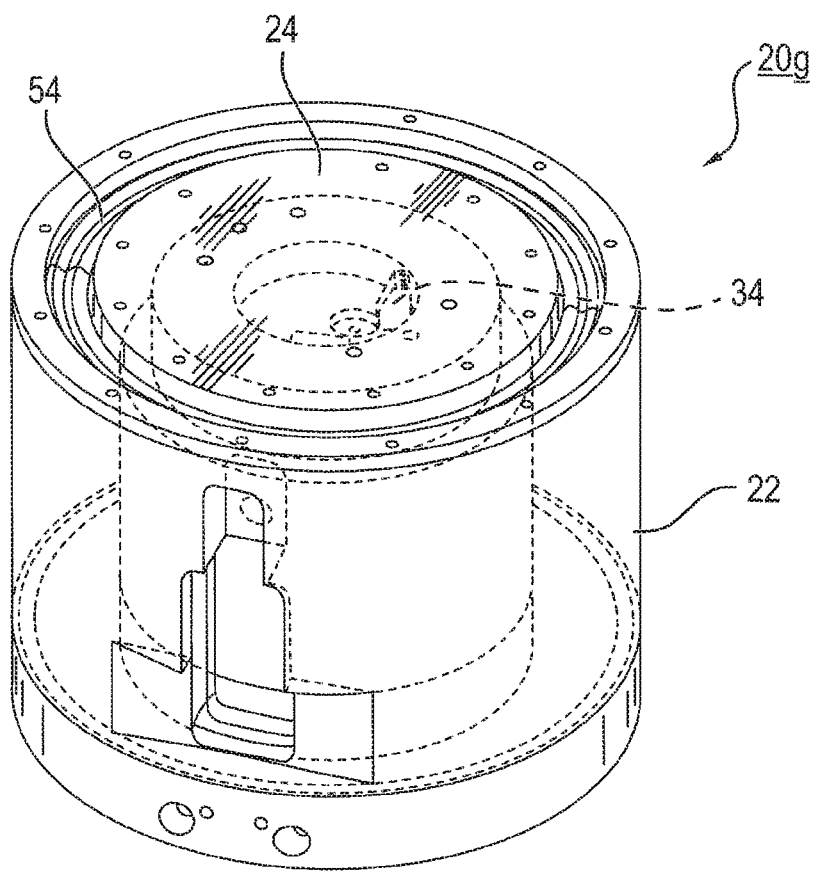

In FIGS. 14 and 15, a modified embodiment is shown in comparison to the embodiment of FIGS. 11 to 13. The two embodiments differ in that in the embodiment according to FIGS. 14 and 15 the path sensor 52 is arranged inside the moving coil drive 30. This makes the overall setup of the welding device positioning arrangement 20g even more compact. FIG. 14 shows the setup inside the moving coil drive 30. A fastening portion for a core of the moving coil drive 30 is indicated by 32 and a connecting portion for the second section 24 by 34.

Figure 16:
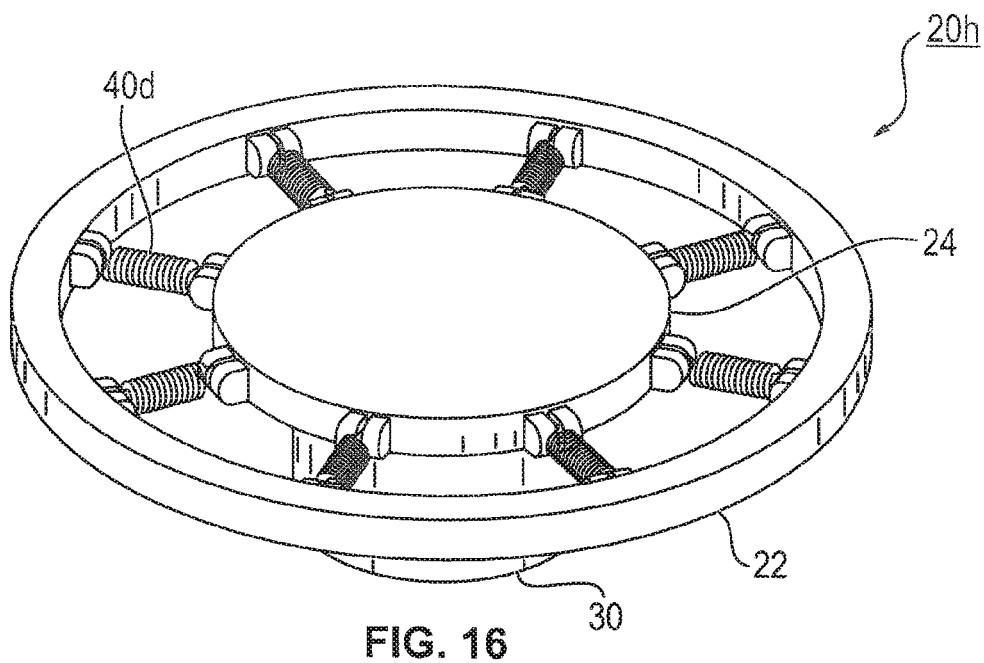
Figure 17:
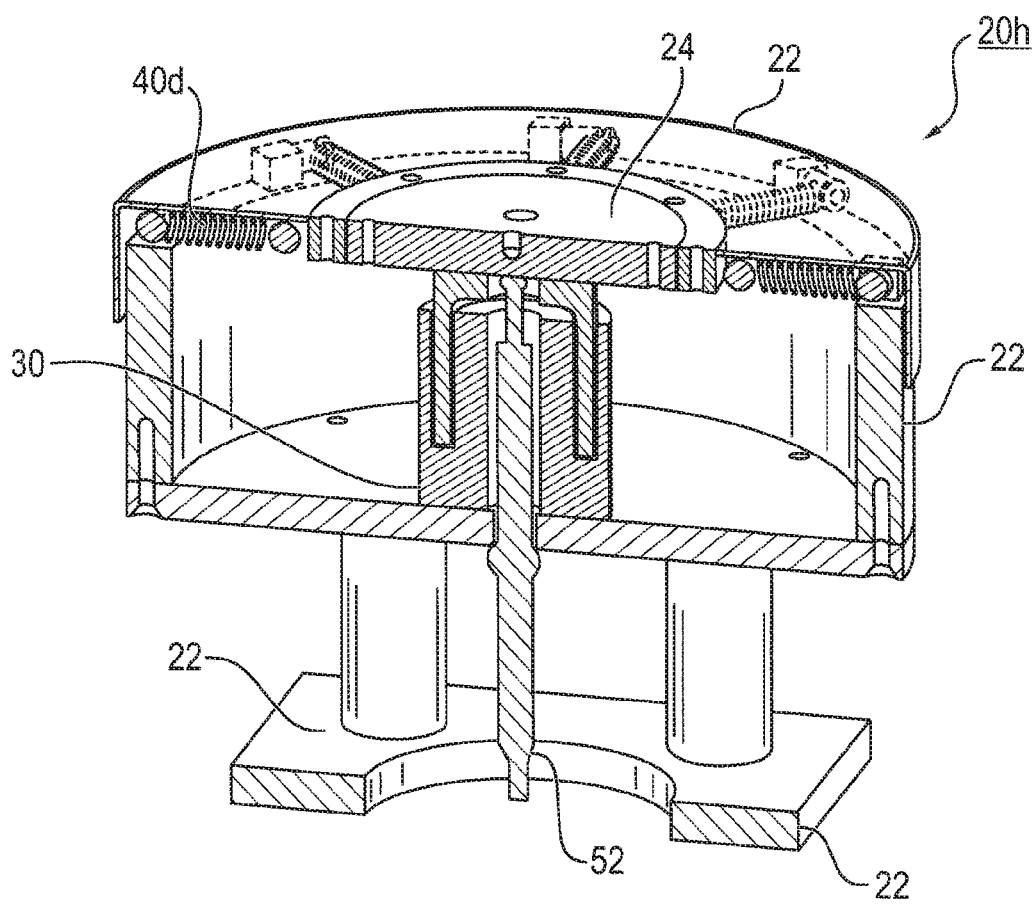

FIGS. 16 and 17 show an eighth embodiment of the welding device positioning arrangement 20h. The essential setup of this embodiment can be compared with the previously described embodiments with centering spider 54. Instead of the centering spider, however, a plurality of springs are used as an elastic guiding system 40d.

FIG. 16 shows the first section 22 in a ring shape. The second section 24 is shown as circularly shaped. A plurality of springs, in the embodiment shown eight springs, which are equally spaced, connect the radial inner side of the ring-shaped first section 22 with the radial outer side of the circularly shaped second section 24.

In FIG. 17, a possible setup of the first section 22 for this embodiment of the welding device positioning arrangement 20h is illustrated. The first section 22 comprises a base portion with a hole from which, for example, four columns extend, only two of which are shown due to the sectional view. A circularly shaped base is arranged at the upper end of the columns, from which a cylindrical shape extends in axial direction. In the initial state, an upper end of the cylindrical shape is aligned again with the second section 24.

The moving coil drive 30 is arranged centrally on the circularly shaped base. The path sensor 52 is arranged in the moving coil drive, wherein a cable of the path sensor 52, for example, is routed through the hole in the base portion of the first section 22.

Figure 18:
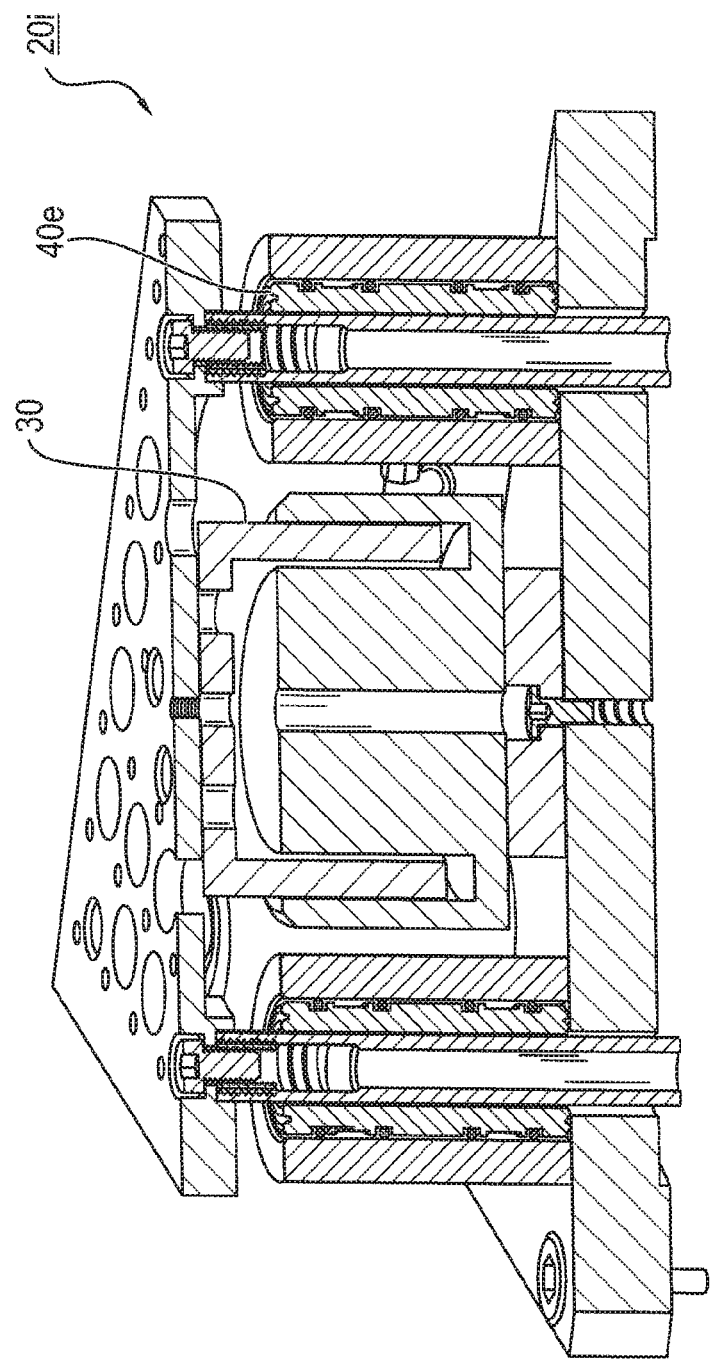

A ninth embodiment of the welding device positioning arrangement 20i is shown in FIG. 18. In this embodiment, air conductions are used as elastic guiding system 40e.

Now, with reference to FIG. 19, a welding device 10 is shown. This comprises a lifting table 12, an upper tool 14 as well as one of the above-described embodiments of the welding device positioning arrangement 20a-20i on the lifting table 12. According to a first alternative, the static first section 22 of the welding device positioning arrangement 20a-i is an integral part of the lifting table 12. According to a second alternative, the static first section 22 is connected to the lifting table 12.

The welding device 10 itself can be any welding device 10, such as an ultrasonic welding device, a laser welding device, an infrared welding device, a vibration welding device or a friction welding device.

Due to the elastic guiding system 40a-40e, the first and the second section can be moved relative to each other along only one axis. This axis may be a vertical axis, with respect to a base on which the welding device 10 is located. During operation, the components to be welded are clamped with the desired force between the upper tool 14 and the second section 24 of the welding device positioning arrangement 20a-20i.

A force with which the components to be welded together can be clamped by means of the welding device 10 is ≤1 kN, preferably ≤500 N and particularly preferred ≤250 N. Especially with filigree components, even lower forces are required, wherein ranges of ≤20 N, preferably ≤10 N and in particular ≤5 N can also be realized with the welding device 10.

Due to the specific setup of the welding device positioning arrangement 20a-i used, an actual force with which the components to be welded together are clamped during operation differs from a predetermined nominal force by a maximum of 2.5 N, preferably by a maximum of 1 N and particularly preferably by a maximum 0.5 N. The same applies to a difference between the actual path and the predetermined nominal path. Thus the actual path by which the axial length of the welding device positioning arrangement 20a-i is varied during operation from a point of origin differs from a predetermined nominal path by a maximum of 1 mm, preferably by a maximum of 0.1 mm and particularly preferably by a maximum of 0.01 mm. Since a high reproducibility of the welding connections can be achieved by means of the welding device positioning arrangement 20a-i, the maximum difference for the force and/or the path is maintained with at least 3, preferably at least 5 and particularly preferably at least 10, consecutive welding processes.

Figure 20:
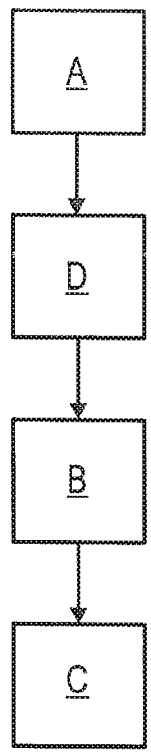

Now, with reference to FIG. 20, a flow chart of an embodiment of an inventive welding method for connecting a first component to a second component is shown using the inventive welding device 10. In the initial state, for example, the two sections of the welding device positioning arrangement are located at a minimum distance from each other. Preferably, the welding device further comprises a lifting table which is initially also in an initial state, i.e. preferably at the greatest possible distance from the upper tool of the welding device. This setup with lifting table is particularly suitable for a manual equipping of the welding device with the components to be welded or for components to be welded the combined component height of which is greater than a maximum length variation of the welding device positioning arrangement.

In a first step A, an arranging of the first component on the movable second section of the welding device positioning arrangement and of the second component on the first component or in an upper tool of the welding device takes place. Then, in step D, the lifting table is moved in the direction of the upper tool of the welding device before the second section is moved relative to the first section, so that first a desired distance between the second section and the upper tool can be set. Alternatively or additionally, a step can be provided in which the upper tool is moved in the direction of the welding device positioning arrangement before the second section is moved relative to the first section, so that a desired distance between the second section and the upper tool can be set.

This is followed in step B by moving the second section relative to the first section. This movement can take place steplessly or in one or more steps. In this way, the first and the second component are kept clamped between the upper tool and the second section by applying a force of in particular ≤1 kN, preferably ≤500 N and particularly preferably ≤250 N. At this, it is preferred that the force is controlled via a motor current of the drive system. In this way, no individual or separate force sensor is required, since, for example, the force is controlled via a motor current for the moving coil drive or similar. This setup may therefore be suitable for drive systems the motor current of which is proportional, especially linear, to the applied force.

It is further advantageous that an actual force with which the components to be welded together are clamped differs from a predetermined nominal force by a maximum of 2.5 N, preferably by a maximum of 1 N, and particularly preferably by a maximum of 0.5 N. In addition or alternatively, it is preferred that an actual path by which the axial length of the welding device positioning arrangement is varied from a point of origin differs from a predetermined nominal path by a maximum of 1 mm, preferably by a maximum of 0.1 mm and particularly preferably by a maximum of 0.01 mm. By this, force peaks during the contact of the two components with the upper tool and a possibly resulting damage or destruction of the components to be welded with each other is avoided.

Eventually, in step C, a welding of the two components with each other takes place. The lifting table and the welding device positioning arrangement can then be moved back to their initial position or to an intermediate position suitable for equipping and the process is repeated. It may also be preferred if the upper tool is moved to its initial position or to an intermediate position suitable for equipping. At this, it may be preferred that the above maximum difference for the force and/or the path is maintained for at least 3, preferably at least 5 and particularly preferred at least 10 consecutive welding processes.

Figure 21:
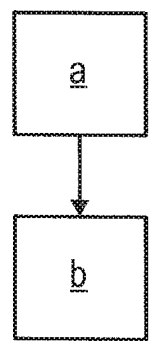

Now, with reference to FIG. 21, a flow chart of a design of an embodiment of a retrofit method for a welding device, in particular a welding device with a lifting table, is shown with an inventive welding device positioning arrangement.

In a first step a, a welding device positioning arrangement according to the disclosure is provided. This can be done by providing a retrofit kit for a welding device, in particular a welding device with a lifting table. The retrofit kit in particular comprises an inventive welding device positioning arrangement.

In a subsequent second step b, an attachment of the welding device positioning arrangement onto the welding device, in particular on the lifting table, takes place in such a manner that during operation a first and a second component can be clamped between an upper tool of the welding device and the second section of the welding device positioning arrangement by applying a force. With the retrofit method, existing welding devices can be retrofitted with the inventive welding device positioning arrangement.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. Welding device positioning arrangement with which, a first component is pressable against a second component with a force, the welding device positioning arrangement comprising the following features:
   a. a static first section and a second section movable relative to the static first section, so that the first component is pressable against the second component by the second section,
   b. at least one drive system connected at a first end to the first section and at a second end to the second section, and
   c. at least one elastic guiding system by which the first section and the second section are connected to each other, wherein
   d. the first section and the second section are movable relative to each other along only one axis due to the at least one elastic guiding system, so that an axial length of the welding device positioning arrangement is variable, and
   e1. the at least one drive system comprises a moving coil drive or
   e2. the at least one drive system comprises a piezo motor, a linear motor, an electromagnetic drive system, a coil system or a drive with field or excitation coil or
   e3. the at least one drive system comprises a rotatory motor which comprises mechanical losses which are less than a force with which the first component is pressable against the second component, wherein the force is ≤1 kN.

2. Welding device positioning arrangement according to claim 1, which comprises at least three drive systems.

3. Welding device positioning arrangement according to claim 1, in which the at least one guiding system comprises at least one centering spider or a plurality of springs.

4. Welding device positioning arrangement according to claim 1, in which the at least one guiding system comprises a first plate and a second plate, wherein the first plate and the second plate are connected to each other at a first axial end, and the first plate is connected to the first section at a second axial end, and the second plate is connected to the second section at a second axial end.

5. Welding device positioning arrangement according to claim 4, which comprises at least two guiding systems.

6. Welding device positioning arrangement according to claim 1, which comprises at least two guiding systems.

7. Welding device positioning arrangement according to claim 1, in which the axial length of the welding device positioning arrangement can be varied in a range of ≤200 mm.

8. Welding device positioning arrangement according to claim 1 in which an actual path by which the axial length of the welding device positioning arrangement is varied from a point of origin differs from a predetermined nominal path by a maximum of 1 mm.

9. Welding device positioning arrangement according to claim 8, with which the maximum difference is maintained for at least 3 consecutive travelling movements.

10. Welding device with a welding device positioning arrangement according to claim 1 as well as an upper tool and a control unit, wherein the movable second section of the welding device positioning arrangement is movable relative to the upper tool by the control unit in such a manner that a first and a second component to be welded together are clampable between the upper tool and the movable second section of the welding device positioning arrangement by applying a force.

11. Welding device according to claim 10, the force of which is ≤1 kN, wherein said force is adapted to clamp the components to be welded together.

12. Welding device according to claim 10, in which the components to be welded are weldable by ultrasonic welding, laser welding, transmission welding, vibration welding or friction welding.

13. Welding device according to claim 10, further comprising a lifting table, wherein the static first section of the welding device positioning arrangement is an integral part of the lifting table or is connected to the lifting table.

14. Welding device according to claim 10, in which an actual force, with which the components to be welded together are clamped during operation, differs from a predetermined nominal force by a maximum of 2.5 N.

15. Welding device according to claim 10, in which an actual path by which the axial length of the welding device positioning arrangement is varied from a point of origin differs from a predetermined nominal path by a maximum of 1 mm.

16. Welding device according to claim 14, in which the maximum difference is maintained for at least 3 consecutive welding processes.

17. Welding device according to claim 15, in which the maximum difference is maintained for at least 3 consecutive welding processes.

* * * * *